Oct. 11, 1927.
W. U. STONEHILL
1,644,696
AUTOMOBILE LAMP
Filed April 25, 1923
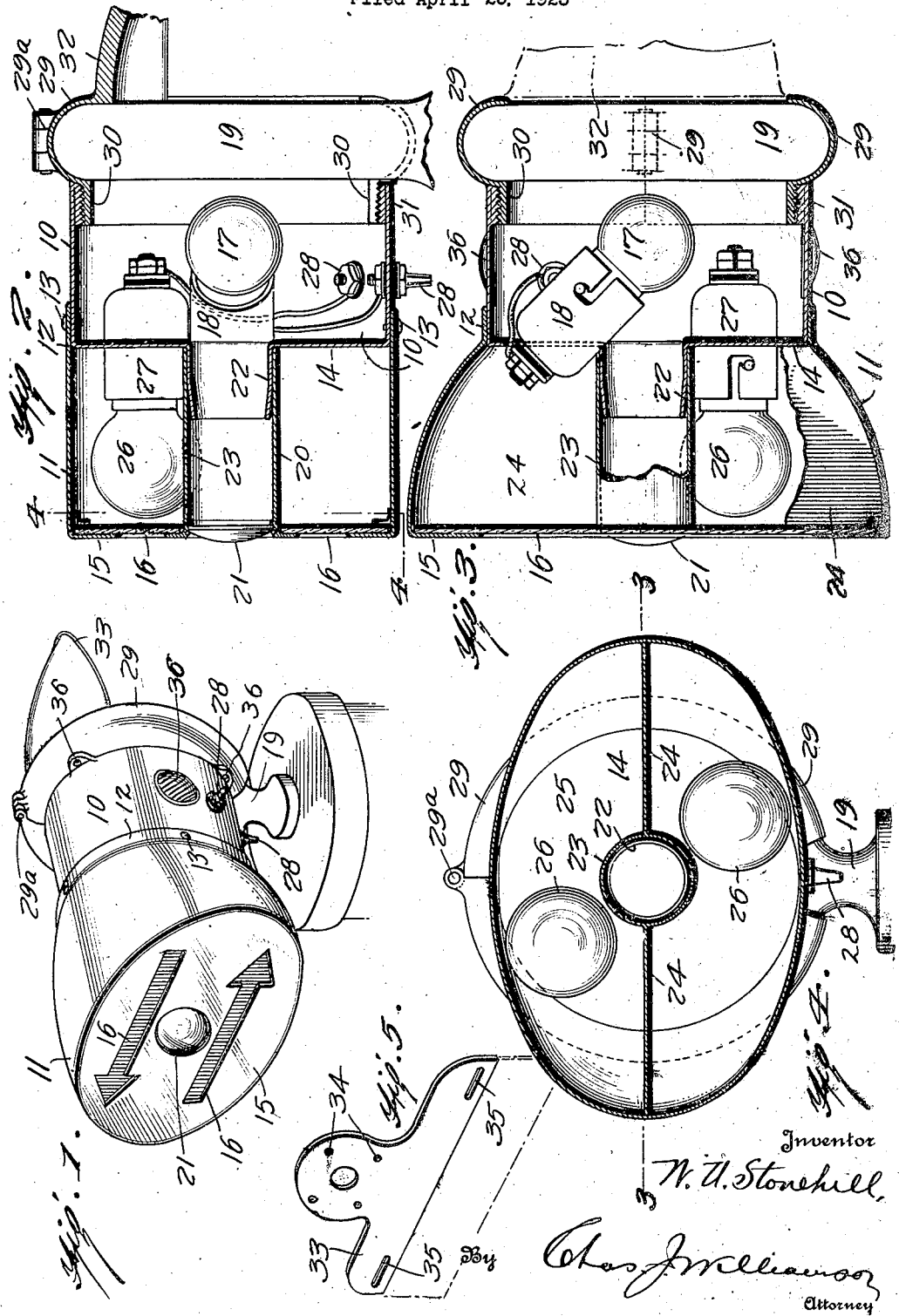

Patented Oct. 11, 1927.

1,644,696

UNITED STATES PATENT OFFICE.

WINALOE U. STONEHILL, OF CINCINNATI, OHIO.

AUTOMOBILE LAMP.

Application filed April 25, 1923. Serial No. 634,579.

The primary object of my invention is to provide a lamp or lighting device which will enable the clear reading of temperature indicating devices such as the Boyce motometer that are applied to the engines of automobiles and in particular to provide a lamp for such purpose capable of mounting directly upon the instrument and which besides illuminating the temperature indicating device may be used as a parking light and a direction signal, and which, in what I now regard as its best and most complete embodiment will combine all of the purposes or functions named and be compact and attractive in appearance, and which may be applied to the rear of the car to serve as a tail and rear parking lamp as well as a direction signal.

My invention consists in whatever is described by or is included within the terms or scope of the appended claim.

In the annexed drawings:

Fig. 1 is a perspective view of a lamp embodying my invention;

Fig. 2 is a vertical longitudinal section with the lamp shown applied to a motometer;

Fig. 3 is a horizontal section;

Fig. 4 is a vertical section on the line 4—4 of Fig. 2;

Fig. 5 is a detail view in perspective showing a form of bracket plate that may be used to support the lamp at the rear of the car.

First describing generally the embodiment of my invention shown in the drawings it will be found to comprise a casing having means to attach it to the motometer so that it projects forward from the motometer and which contains an electric lamp situated immediately in front of the motometer so as to shine rearwardly through the same and has a central passage extending forwardly from said lamp with a lens through which the lamp light is projected forwardly, and has two light proof compartments each of which contains an electric lamp, having each an arrow, of transparent material which will be illuminated when the lamp is in circuit and serves as a direction indicator, one arrow, of course, pointing to the right and the other pointing to the left.

Describing now in detail what is shown in the drawings, the casing comprises a rear cylindrical member, 10, and a front more or less elliptical member, 11, the two being separably joined by a cylindrical rear flange, 12, on the elliptical member that slips over the forward portion of the cylindrical member, 10, and the two joined as by several screws, 13, that pass over the overlapping portions. The two members, 10, and 11, may be cup-shaped each being formed by means of dies of suitable sheet metal so that the rear member, 10, has an integral front wall, 14, that forms a partition that divides the casing into front and rear compartments and the elliptical member, 11, has an integral wall, 15, which forms the front of the casing and which, of course, has an elliptical shape and as shown in the drawings when the two parts of the casing are combined and the device is mounted on the motometer the major axis of the ellipse extends horizontally. The minor axis of the ellipse is the diameter of the rear cylindrical casing part, 10. This elongated or oblong form is given the front portion of the casing so as to produce a device which is compact vertically and yet will afford ample room for the direction indicating arrows, 16, which, of course, extend horizontally and which are formed by arrow-shape slots cut respectively above and below the major axis, the slots being covered by suitably colored glass or other transparent material. Of course, the front portion of the casing could be circular, but as the circular form would have a bulk and quantity of material that might be objectionable in appearance and weight.—the diminution of weight as far as possible being important because as shown the device is mounted upon and supported by the motometer. The elliptical or horizontally elongated form results in the advantages of compactness, diminution of weight and attractiveness of appearance without impairing the direction signalling functions of the lamp.

Mounted in rear of the partition, 14, is an electric lamp, 17, of well known construction. the socket 18, for which, is attached to the partition, 14, so as to extend at an incline rearward therefrom to place the lamp, 17, at the center of the casing just in front of the motometer, 19, and in line with a tubular passage, 20, that extends forward from the partition, 14, with its front end closed by a lens, 21, that may serve as a parking lamp. The tubular passage, 20, may be formed of telescoping tubular sections, 22, and 23, which are respectively integral with the partition, 14, and the front wall, 15.

Extending parallel with the major axis of the ellipse between the outer side of the tubular passage, 20, and the interior of the front casing, 11, is a horizontal partition, 24, which provides upper and lower light proof chambers, 25, in each of which is mounted an electric lamp, 26, for illuminating the direction signals, each lamp, 26, being mounted in a socket, 27, which is attached to and projects in front and rear of the partition, 14, this manner of mounting the socket, 27, as in the case of mounting the lamp socket, 18, being to economize space within the casing as much as possible while at the same time rendering access to the lamps for insertion and removal as convenient as possible.

From the binding post of each lamp a wire runs to a terminal plug socket, 28, situated conveniently and inconspicuously on the rear casing member, 10, a separable connection of the circuit wires being desirable to facilitate the manipulation of the motometer when the removal of the radiator cup and its replacement are necessary. I have not considered it necesary to show in the drawings the circuit connections including the switches for controlling the lighting and extinguishing of the lamps.

Various devices may be employed for mounting my lamp upon the motometer. I show in the drawings one arranged which comprises a diametrically split ring, 29, which in cross section is substantially semicircular so that it will fit over the convexly rounded or shaped periphery of the motometer, 19, which split ring, 29, is provided with an externally threaded neck or flange, 30, upon which the internally screw threaded rear portion, 31 of the casing member, 10, may be screwed when the two parts of the ring, 29, are applied to the motometer, and thus an efficient clamping connection with the motometer is provided and the lamp is rigidly supported from the motometer. Preferably the two portions of the ring, 29, are connected by a hinge, 29ª, to prevent their separation and loss when not applied to the motometer coupled with the lamp casing. Preferably the split ring, 29, at its upper part is provided with a rearward extension, 32, that forms a visor at the upper part of the motometer and by its location on the side of the motometer opposite the lamp tends to balance the load of the lamp on the motometer support and thus avoids objectionable strains from the weight of the lamp thereon.

By omitting the motometer clamping ring 29, a lamp embodying my invention may be applied to the rear of the car where it will serve all the functions of parking light, tail lamp, direction indicator and license plate illuminator, it being necessary merely to provide at the rear of the car a proper supporting bracket, which as shown in Fig. 5 may comprise a metal plate, 33, having provision such as holes, 34, in its upper part to receive screws passing through a corresponding number of radial lugs, 36, provided at the rear end of the casing member, 10, the plate, 33, having holes, 35, for the attachment of the license plate.

On diametrically opposite sides of the rear casing member, 10, and receiving light from the lamp or lighting device, 17, are right of way signals that consist respectively of lens covered openings, 36, in the casing side, the lenses being respectively red and green.

It will be evident that by my invention I provide in a most compact form a lamp serving in a single device the purpose of a number of separate lamps, and which is particularly useful in lighting up the temperature indicator and which by its configuration and finish may be made to enhance the appearance of or ornament the car. As I have already indicated the form in which my invention may be embodied may be widely varied.

What I claim is:

A lamp for motor vehicles comprising a casing of a substantially cylindrical portion and a portion forward of the substantially cylindrical portion which enlarges forward and which has a vertical front wall with openings constituting direction signals, such forward portion having two compartments, each with a lamp, one for each of the direction signals, said casing having at front and back alining-light-emitting openings, the front one being situated between the two direction-signalling openings, a single lamp supported within the substantially cylindrical portion of the casing in line with said openings and shining simultaneously through both of them when lighted and the substantially cylindrical portion of the casing having an opening in its side for the lateral emission of light from said last mentioned lamp, said casing being adapted for mounting, either at the front of the vehicle or the rear of the vehicle, and when mounted at the rear furnishing light for parking and tail-light purposes.

In testimony whereof I hereunto affix my signature.

WINALOE U. STONEHILL.